US007443998B2

(12) United States Patent
Hachiya

(10) Patent No.: US 7,443,998 B2
(45) Date of Patent: Oct. 28, 2008

(54) SPEAKER DIAPHRAGM AND MANUFACTURING METHOD THEREOF

(75) Inventor: Satoshi Hachiya, Yamagata-ken (JP)

(73) Assignees: Pioneer Corporation, Tokyo (JP); Tohoku Pioneer Corporation, Yamagata-ken (JP)

( * ) Notice: Subject to any disclaimer, the term of this patent is extended or adjusted under 35 U.S.C. 154(b) by 621 days.

(21) Appl. No.: 10/446,814

(22) Filed: May 29, 2003

(65) Prior Publication Data

US 2003/0223613 A1 Dec. 4, 2003

(30) Foreign Application Priority Data

Jun. 4, 2002 (JP) ............................. 2002-162972

(51) Int. Cl.
*H04R 25/00* (2006.01)
*D04B 1/08* (2006.01)
*B32B 27/04* (2006.01)

(52) U.S. Cl. ....................... 381/426; 381/423; 442/320; 428/297.4

(58) Field of Classification Search ................. 381/408, 381/423, 426; 181/167, 169, 170–171; 600/410; 442/320; 428/297.4, 297.7
See application file for complete search history.

(56) References Cited

U.S. PATENT DOCUMENTS

| | | | | | |
|---|---|---|---|---|---|
| 2,624,417 | A * | 1/1953 | Brennan | ..................... | 181/169 |
| 2,716,462 | A * | 8/1955 | Brennan | ..................... | 181/169 |
| 4,359,132 | A * | 11/1982 | Parker et al. | ................ | 181/169 |
| 4,518,642 | A * | 5/1985 | Johnston et al. | ............. | 428/172 |
| 4,562,899 | A * | 1/1986 | Nakamura | .................. | 181/169 |
| 5,180,785 | A * | 1/1993 | Uryu et al. | .................. | 525/240 |
| 2003/0211282 | A1* | 11/2003 | Tung-Siang et al. | ......... | 428/114 |

FOREIGN PATENT DOCUMENTS

JP 6-178385 6/1994

* cited by examiner

*Primary Examiner*—Curtis Kuntz
*Assistant Examiner*—Phylesha L Dabney
(74) *Attorney, Agent, or Firm*—Arent Fox LLP

(57) ABSTRACT

A speaker diaphragm which has a high rigidity and can improve sound transmission speed for better sound quality is provided. The speaker diaphragm contains fibers of 3 to 50 mm length mixed in matrix resin. The fibers are oriented radially from center to periphery in surface layers of the diaphragm, while they are oriented in different directions in a middle layer. After setting the resin, these fibers are fixed in the matrix resin with certain tension applied thereto.

3 Claims, 5 Drawing Sheets

SPEAKER DIAPHRAGM AND MANUFACTURING METHOD THEREOF

BACKGROUND OF THE INVENTION

The present invention relates to a speaker diaphragm and a manufacturing method thereof.

The present application claims priority from Japanese Application No. 2002-162972, the disclosure of which is incorporated herein by reference.

Speaker diaphragms are desired to have the following properties: High specific modulus and high specific flexural rigidity, high internal loss for the purpose of flattening the frequency response, durability to withstand mechanical fatigue, and resistance to various ambient conditions in which the speaker is used. To satisfy these requirements, various materials have been used for speaker diaphragms such as metal, ceramic, synthetic resin, synthetic fiber, natural fiber, and the like, and various techniques have been developed for better combinations or processing methods of these materials.

Speaker diaphragms made of synthetic resin can be manufactured with good productivity and have good environment resistance such as water resistance. Thermoplastic resin such as polypropylene (PP) that has high internal loss is used, for example, and it is the known practice to add fibers such as carbon fibers in the resin so as to attain a higher specific modulus for better sound quality.

One prior art example of speaker diaphragm made of fiber-reinforced resin is shown in Japanese Patent Application Laid-Open No. Hei 6-178385. According to this prior art, a diaphragm is formed by an injection molding or extrusion molding method from a resin composition including 100 weight parts of resin component including polypropylene polymer and polyolefin resin or rubber, 1 to 50 weight parts of glass balloon, and 5 to 30 weight parts of carbon fiber or carbon graphite. Further, this publication teaches that sufficient reinforcement can be achieved by using chopped carbon fiber of 1 to 10 mm filament length.

A common problem with diaphragms made of such fiber-reinforced resin is that an increase in the amount of fiber leads to a decrease of internal loss, making it difficult to flatten the frequency response, while a decrease in the amount of fiber in an attempt to attain effectively high internal loss will only result in a reduction in sound transmission speed due to smaller specific modulus, because of which favorable sound quality cannot be achieved.

Since specific modulus represented by $E/\rho$ (E: elastic modulus, $\rho$: density) is a physical property, not only material but also structural factors can contribute to its improvement. For example, it is known that a fiber-reinforced resin diaphragm having a foamed layer thereinside has an improved specific modulus because of the decreased apparent density.

Forming such foamed layers in diaphragms, however, involves various complications: The fabrication process becomes complicated because of the necessity to admix a blowing agent in resin, or to perform fine control of pressure in molding. Foams reduce the mechanical rigidity of the diaphragm, and in some cases they may deteriorate its outer appearance.

Another problem with a foamed layer in a diaphragm is that while it helps attain a certain degree of specific modulus, it releases its internal stress, because of which the diaphragm's performance in sound transmission speed cannot be enhanced.

SUMMARY OF THE INVENTION

The present invention has been devised to resolve these problems, and an object of the present invention is to provide methods of enhancing internal loss and sound transmission speed of speaker diaphragms for ensuring better performance.

To achieve the above object, according to a first aspect of the present invention, a speaker diaphragm is formed of a fiber-reinforced resin including a resin and fibers in the resin, wherein the fibers have a length in a range of 3 to 50 mm, and the fibers in surface layers of the diaphragm are oriented in a different direction from that of the fibers in a middle layer of the diaphragm.

According to a second aspect of the present invention, a speaker diaphragm is formed of a fiber-reinforced resin including a resin and fibers in the resin, wherein the fibers are fixed in the resin with tension applied along directions in which the fibers are oriented.

According to a third aspect of the present invention, a method for manufacturing a speaker diaphragm formed of a fiber-reinforced resin including a resin and fibers in the resin, includes the steps of: preparing a molding material containing the fibers having a length in a range of 3 to 50 mm mixed with the resin, the fibers being oriented along a direction of the length thereof; melting and injecting the molding material into a cavity formed by a mold; and setting the molding material inside the mold.

According to a fourth aspect of the present invention, a method of manufacturing a speaker diaphragm formed of a fiber-reinforced resin including a resin and fibers in the resin, includes the steps of: preparing a molding material containing the fibers having a length in a range of 3 to 50 mm mixed with the resin, the fibers being oriented along a direction of the length thereof; melting and feeding the molding material into a lower mold; pressing the molding material in the lower mold with an upper mold; and setting the molding material between the upper and lower molds.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Preferred embodiments of the present invention will be described below with reference to the accompanying drawings.

Figure 1:
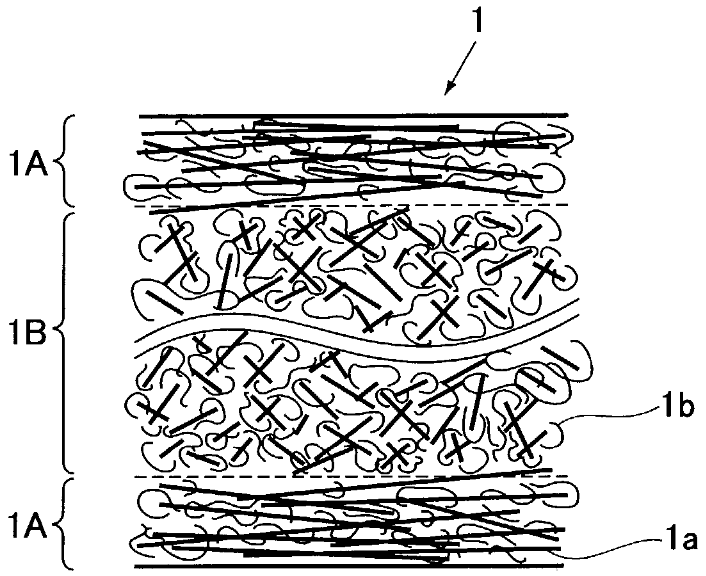
FIG. 1 is a diagram illustrating the internal structure of a diaphragm according to the present invention.

The speaker diaphragm (hereinafter referred to simply as "diaphragm") according to the embodiment of the present invention is made of long-fiber reinforced resin including fibers of 3 to 50 mm length contained in matrix resin by a resin molding process. FIG. 1 is a microscopic cross section of the internal structure of this diaphragm. The diaphragm 1 is comprised of fibers 1*a* indicated as short and long lines and a resin component 1*b* intertwining with the fibers 1*a*. The fibers 1*a* are oriented in specific directions, intertwined with each other, and set in position by the resin component 1*b*.

Figure 2:
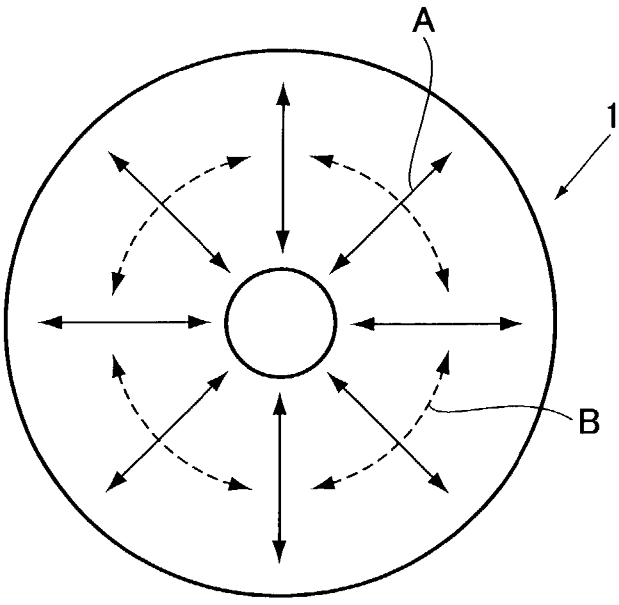
FIG. 2 is a diagram illustrating the fiber orientations in the diaphragm.

The fiber orientation in a surface layers 1A differs from that in a middle layer 1B formed therebetween. FIG. 2 shows one example of fiber orientations for a conical diaphragm 1; solid line arrows A indicate the radial or center-to-periphery orientation of fibers in the surface layers 1A, and broken line arrows B indicate the circumferential orientation of fibers in the middle layer 1B.

The fibers 1*a* are thus oriented in specific directions in the resin component 1*b*, and moreover, they are retained with tension applied substantially uniformly. Thus the fibers 1*a* having certain length are fixed in a state wherein they intertwine with each other and are locally unidirectional, whereby an internal stress applied to the fibers 1*a* is built up inside. The resin component 1*b* may further contain finely chopped fillers such as short graphite fibers, carbon graphite, or mica.

The diaphragm 1 according to the present embodiment has the following characteristics. Firstly, the orientation of the 3 to 50 mm long fibers 1*a* is differed from the surface layers 1A to the middle layer 1B. This means that long fibers 1*a* overlapping each other at both ends and locally forming continuous lines are oriented in various directions in the resin component 1*b*, whereby the internal stress that is built up along the fibers 1*a* acts multidimensionally.

Such multidimensional, overlapping long fibers can increase internal loss of the diaphragm, as well as make its sound transmission speed sufficiently high due to the continuity and multidirectionality of the fibers 1*a*, enabling the diaphragm 1 to output high quality sound. Also, the multidimensional internal stress or multidirectionality of the fibers 1*a* makes the lateral and vertical rigidity substantially equal, which enables even dispersion of stress transmitted from a vibration source such as a voice coil. The sound quality is thereby further enhanced.

Secondly, because the fibers in the surface layers 1A are oriented radially from center to periphery of the diaphragm, the internal stress or rigidity is made equal in both radial and circumferential directions respectively indicated by arrows A and B in FIG. 2. This leads to even sound transmission characteristics from center toward periphery and higher flexure resistance when the diaphragm is installed in a speaker set. These all contribute to better sound quality.

Thirdly, the fibers 1*a* oriented in predetermined directions inside the resin are fixed with certain tension applied thereto. This means that vibration is transmitted along the stretched fibers 1*a*, hence making speed of sound transmission faster than ever. Therefore, a certain degree of transmission speed is ensured even with a high ratio of resin component 1*b* for larger internal loss. The frequency response is flattened, and sound quality is thereby improved.

Fourthly, because the fibers 1*a* having a 3 to 50 mm length are fixed in a stretched state in different orientations in the surface layers and in the middle layer of the diaphragm, they are arranged in the resin component 1*b* with their ends overlapping one another and locally forming continuous lines, thus orienting the tension applied thereto in multidimension.

Thereby, even though the proportion of resin component 1*b* is made higher to increase internal loss, the sound transmission speed of the diaphragm can be made sufficiently high due to the continuality and tension of the fibers 1*a*. By optimally adjusting the ratio of fibers 1*a* to the resin, the transmission speed can be made very high. This can provide a diaphragm 1 with improved sound quality. Moreover, the multidimensional tension or multidirectionality of the fibers 1*a* makes the lateral and vertical rigidity substantially equal, which enables even dispersion of stress transmitted from a vibration source such as a voice coil. These all lead to better sound quality of the diaphragm.

In addition to the foregoing features, fifthly, the fibers 1*a* intertwine with each other in the resin component 1*b*, forming a quasi-three-dimensional mesh structure, which decreases the resin density as would be by a foamed layer. Also, the multidimensional intertwining structure of the fibers 1*a* provides high rigidity in multidirections.

Sixthly, by further adding fillers in the resin component 1*b*, the mechanical strength of the diaphragm can be increased while good sound quality is ensured.

Figure 3:
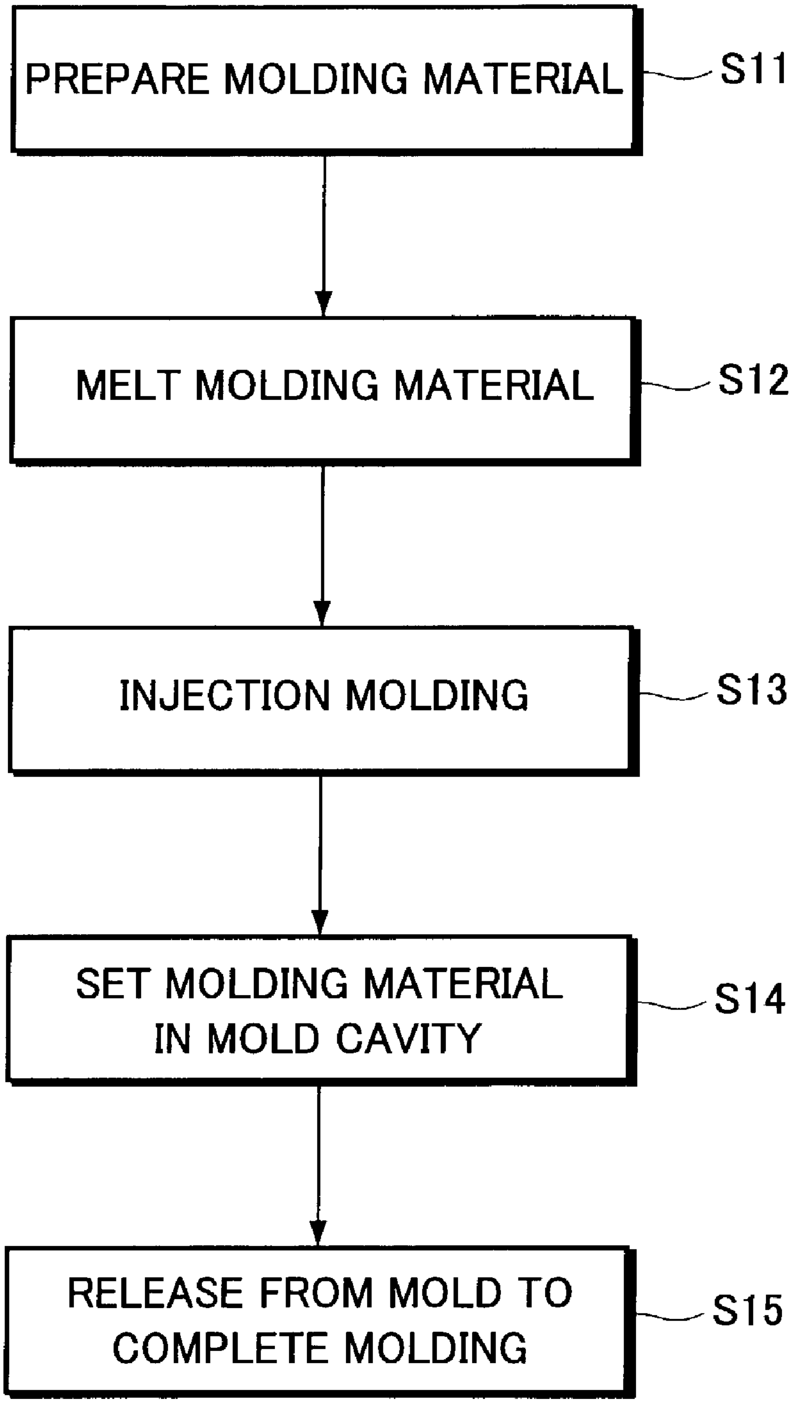
FIG. 3 is a flowchart for explaining a manufacturing method of a speaker diaphragm according to one embodiment of the present invention.

The following is a description of a method for manufacturing speaker diaphragms according to the present invention, and FIG. 3 is a flowchart for explaining the manufacturing method according to one embodiment of the invention. At step S11, fibers of 3 to 50 mm length are mixed in matrix resin such that they are oriented in the direction of their length to form a long-fiber reinforced molding material. At step S12, heat is applied to melt this molding material. At step S13, molten molding material is injected into a mold for injection molding. When forming a conical diaphragm, molten resin is injected radially from center to periphery of the diaphragm. At step S14, resin in the mold is cooled and set. At step S15, the molded article is removed from the mold.

Figure 4:
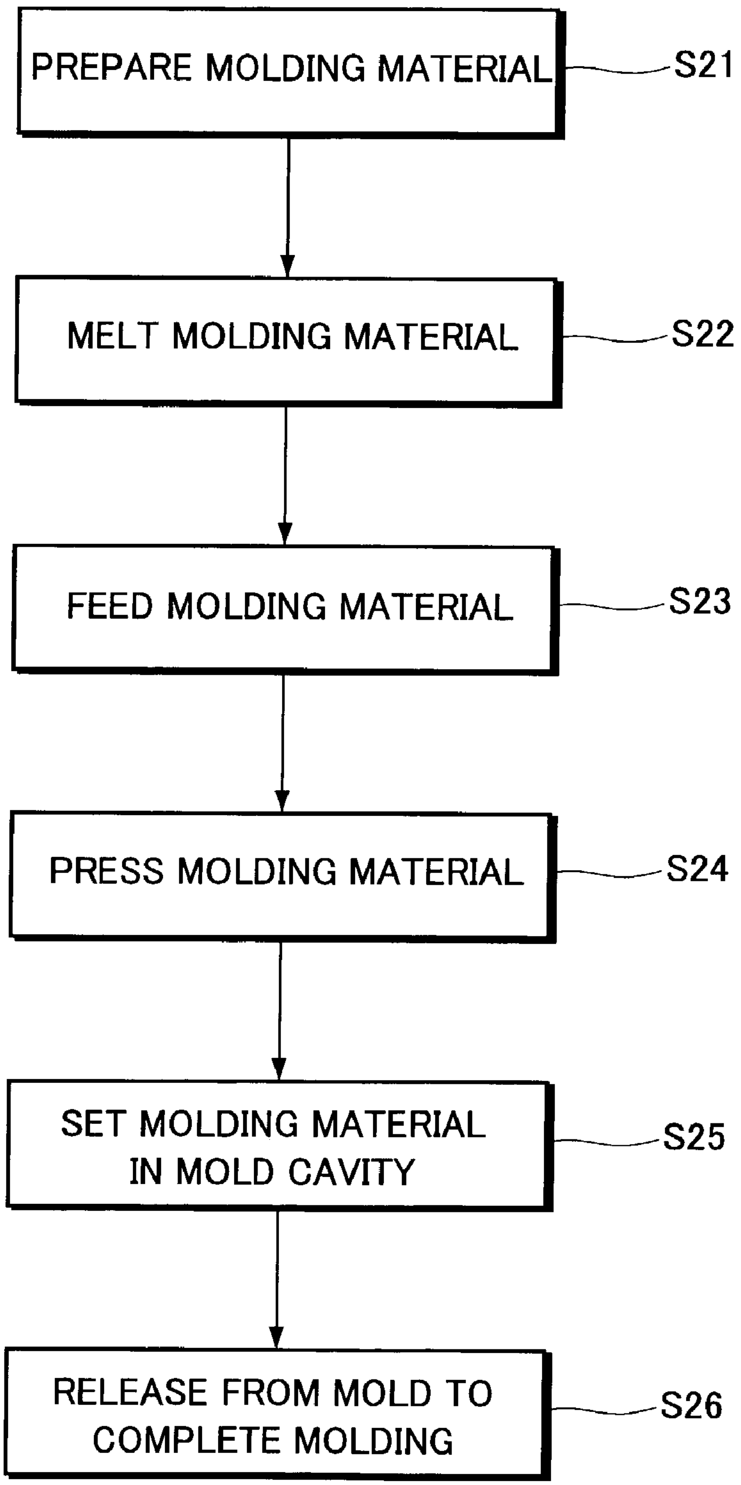
FIG. 4 is a flowchart for explaining a manufacturing method of a speaker diaphragm according to another embodiment.

FIG. 4 is a flowchart for explaining a method for manufacturing diaphragms according to another embodiment of the present invention. At step S21, fibers of 3 to 50 mm length are mixed in matrix resin such that they are oriented in the direction of their length to form a long-fiber reinforced molding material. At step S22, heat is applied to melt this molding material. At step S23, molten molding material is fed into a lower mold. At step S24, an upper mold is pressed down upon the molding material in the lower mold. At step S25, resin in the mold is cooled and set. At step S26, the upper and lower molds are opened to remove the molded article. With this method, finely chopped fillers such as short-fiber graphite, carbon graphite, mica and the like may be added in the molding material.

According to this method, the molding material contains 3 to 50 mm long fibers oriented along the direction of their length (as a seventh characteristic). During the injection molding for injecting the molten molding material into a cavity of the mold, when the molding material having specific fiber orientation flows inside the mold, the fibers contained in surface layers directly in contact with the mold surfaces are oriented along the flowing direction of the resin, while those in the middle layer remain in the initial orientation. As a result, when the molding material is set, its surface layers have a different fiber orientation from that of the middle layer.

As the molding material with oriented fibers cools down in the confined space of the mold, it sets such as to contain an internal stress created by the difference in cooling speed between the fibers and resin. Thereby the internal stress is built up inside.

At this time when the fibers are oriented in different directions between surface layers and middle layer, the internal stress applies tension to the fibers. Moreover, the fibers having a length of 3 to 50 mm intertwine with each other.

The diaphragm thus manufactured has the first to fifth structural characteristics described above. As compared to diaphragms having foamed layers, they can be manufactured with good productivity due to simplified process steps.

Since the molding material is injected radially from center to periphery of the diaphragm at step S13, fibers in the surface layers are oriented radially, while fibers in the middle layer are oriented in a different, e.g., circumferential direction (as an eighth characteristic). Thus the resultant diaphragm has the second characteristic feature mentioned above. Moreover, because the fabrication process is simplified, such diaphragms can be manufactured with good productivity as compared to those with foamed layers.

According to the other method, the molding material containing 3 to 50 mm long fibers oriented along the direction of their length is molded between upper and lower molds. When the molten molding material in the lower mold is pressed by the upper mold, the fibers contained in surface layers directly in contact with the upper and lower mold surfaces are oriented along the flowing direction of the resin, while those in the middle layer remain in the initial orientation. As a result, when the molding material is set between the upper and lower molds, its surface layers have a different fiber orientation from that of the middle layer (as a ninth characteristic). As the resin cools down, it sets such as to contain an internal stress that acts along the fibers. Diaphragms having the first to fifth characteristic features mentioned above are thus manufactured with good productivity.

Furthermore, by mixing fillers in the molding material, the resultant diaphragms will have enhanced mechanical strength (as a tenth characteristic) in addition to all those characteristics described above.

EXAMPLE

Further, specific examples of the present invention will be hereinafter described.

Materials

The speaker diaphragm according to one embodiment of the present invention is made of a material selected from the following.

For the matrix resin, any one of the following thermoplastic resins may be used either alone or in combination: polypropylene, propylene-ethylene block copolymer, propylene-ethylene random copolymer, polyolefin resin such as polyethylene, polystyrene, rubber-modified shock-proof polystyrene, polystyrene resin such as polystyrene having a syndiotactic structure, ABS resin, polyvinyl chloride resin, polyamide resin, polyester resin, polyacetal resin, polycarbonate resin, aromatic polyether or thioether resin, aromatic polyester, polysulfone resin, and acrylate resin.

For the fibers mixed in the matrix resin, any one of the following materials may be used either alone or in combination: para-aromatic polyamide fibers, carbon fibers, glass fibers, polyketone fibers, poly-p-phenylene benzobisoxazole (PBO) fibers, meta-aromatic polyamide fibers, polyethylene naphthalate (PEN) fibers, polyester fibers, and wholly aromatic polyester fibers (liquid crystal polymer).

For the fillers, any one of mica, talc, calcium carbonate, carbon graphite, whisker, and the like may be added as required.

Molding Material

The following is one example for the molding materials in the present invention. Long-fiber reinforced molding material is prepared in pellet form. Fibers are mixed to the matrix resin in a proportion of 1 to 95% by weight, in which base resin has a proportion of 5 to 99% by weight, with or without fillers which may be added as required. Fibers have a length ranged from 3 to 50 mm, and they are oriented parallel to one another to form a pellet shape of long fiber reinforced molding material.

Molding Method

Figure 5:
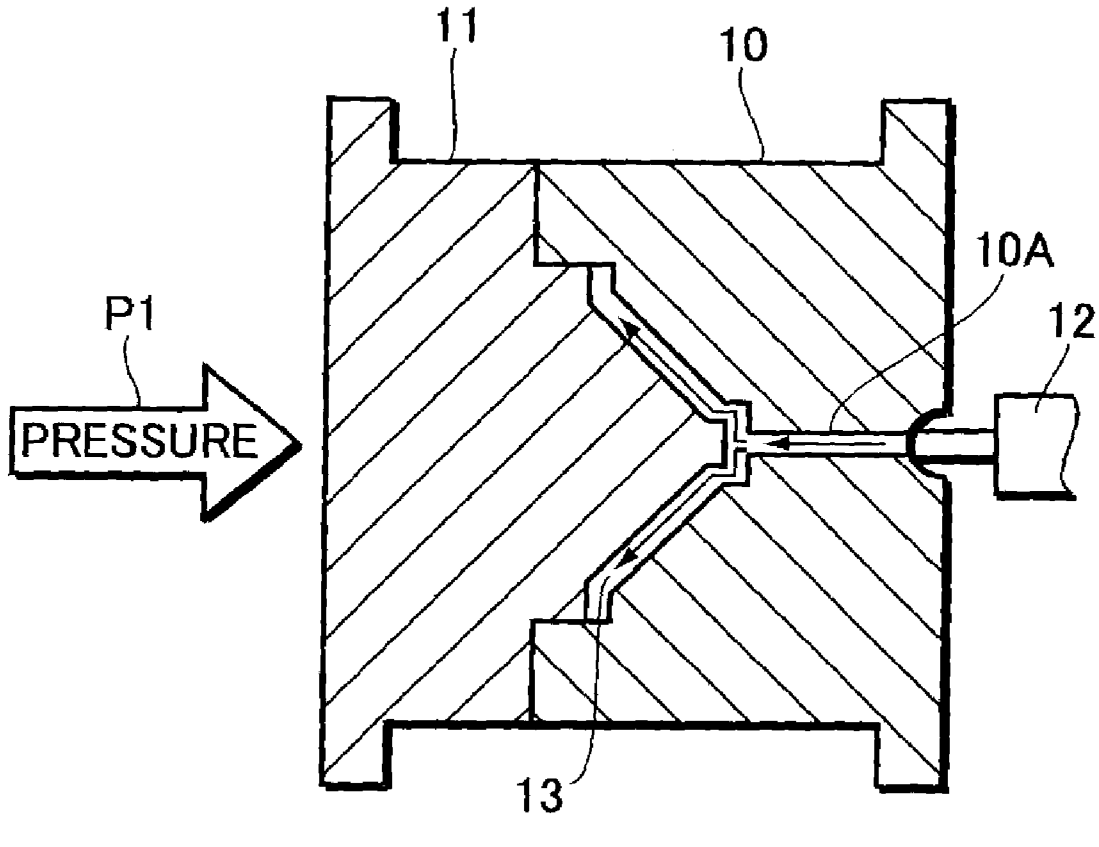
FIG. 5 is a schematic representation of a working example of the speaker diaphragm manufacturing method.

FIG. 5 illustrates one method of forming a diaphragm according to one embodiment of the present invention using injection molding. In this figure, reference numerals 10, 11 represent a mold, 12 a nozzle, and 13 a cavity formed inside the mold.

Molten molding material prepared as described above is injected from the nozzle 12 into the cavity 13 through an injection hole 10A of the mold 10. The injection hole 10A is positioned at a central location of a diaphragm to be molded, so that injected molding material flows from center to periphery as indicated by the arrows to fill the cavity 13.

Pressure P is applied to the molds 10 and 11 during this time. When the molding material has been filled, the molds 10 and 11 are cooled down with the pressure P still being applied, until the molding material inside the cavity 13 is set. When the molding material has completely set after a duration of predetermined time, the molded diaphragm is released from the mold 10, 11.

According to this method, when the molten molding material having specific fiber orientation flows from center to periphery inside the cavity 13, fibers contained in surface layers directly in contact with inner surfaces of the cavity 13 are oriented along the radial flowing direction. Therefore, while the fiber orientation in the surface layers of the molding material in the cavity 13 is from center to periphery, it is different in the middle layer inside the surface layers. Also, since the fibers have a relatively long length of 3 to 50 mm, they intertwine with each other in a continuous manner along the oriented directions.

While the resin is cooled down, a small internal stress is created inside because of the difference in cooling speed between the resin and fibers. This internal stress causes the fibers to be oriented and fixed in the resin in a stretched manner. Thus fibers in the resin have a mesh-like orientation, those in the surface layers and middle layer crisscrossing each other. Furthermore, the fibers are fixed in an intertwined state, with tension applied in respective directions.

Figure 6A:
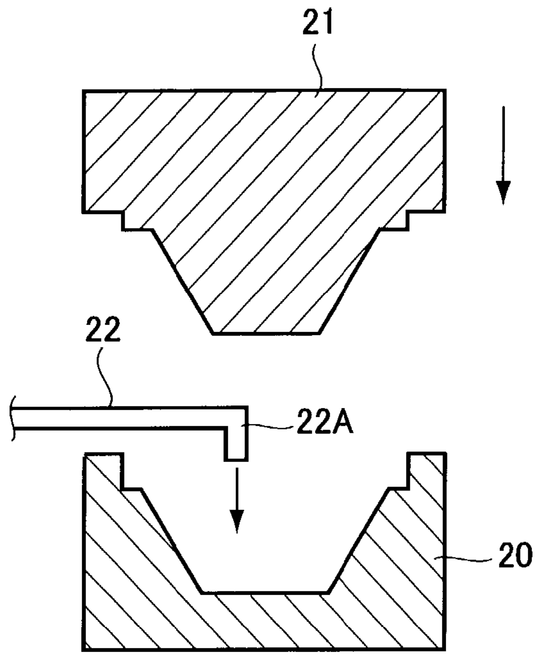
FIGS. 6A, 6B, and 6C are schematic representations of another working example of the speaker diaphragm manufacturing method.
Figure 6B:
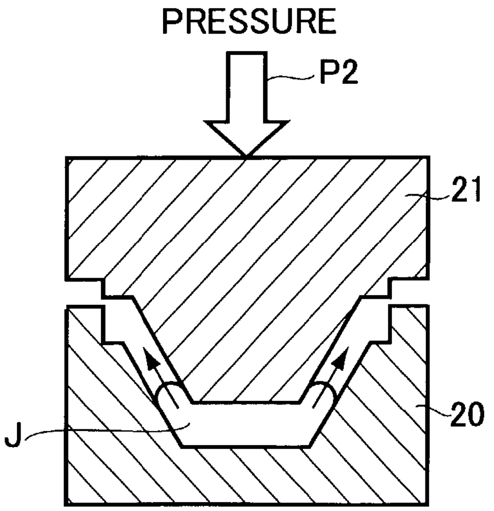
Figure 6C:
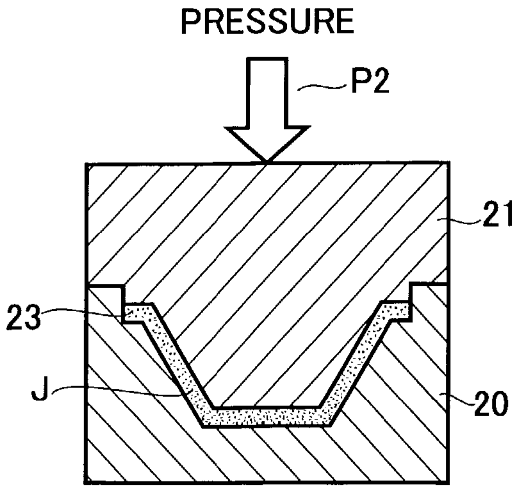

FIGS. 6A, 6B and 6C illustrate another method for manufacturing a diaphragm according to the present invention using a stamping mold method. In the figures, reference numerals 20 and 21 represent a lower mold and an upper mold, respectively. Reference numeral 22 represent a feed pipe, and 22A a feed nozzle. Molten molding material prepared as described above is supplied from the feed nozzle 22A into the lower mold 20, as shown in FIG. 6A. The upper mold 21 is lowered upon the molding material in the lower mold 20 and pressed down with pressure P2, as shown in FIG. 6B. This pressure causes the molding material J to flow in the directions indicated by the arrows, thus filling the cavity 23 completely with the lower mold 20 and upper mold 21 in contact with each other, as shown in FIG. 6C. The upper and lower molds 21 and 20 are then cooled down with the pressure P2 still being applied, until the molding material J inside the cavity 23 is set. When the molding material has completely set after a duration of predetermined time, the molded diaphragm is released from the upper and lower molds 21 and 20.

According to this method, similarly to the above-described injection molding method, the resin flows shown in FIG. 6B caused by the pressure from the upper and lower molds 21 and 20 determine the orientation of fibers in the surface layers differently from that of the fibers in the middle layer. Also, the resin cooled inside the cavity 23 contains an internal stress.

Diaphragms manufactured in accordance with any of the methods described above will have the following effects.

(1) Contained fibers have a long filament length and a three-dimensional mesh-like structure having suitable porosity, whereby the diaphragm has a low density and thus is lightweight. Since the three-dimensional mesh-like structure is formed by the fibers having an anisotropic orientation and continuously intertwining with each other in all directions, the diaphragm has a high multidimensional rigidity.

(2) The diaphragm has a high sound transmission speed due to the fibers having an anisotropic orientation and fixed in position with tension applied thereto.

(3) The diaphragm has an improved internal loss because the intertwined portions of long fibers provide a vibration damping effect at contacting (intertwining) points.

(4) The diaphragm exhibits good environment resistance because rigidity variations caused by temperature changes are reduced due to the multidimensional high rigidity.

(5) By using organic fibers having favorable stretch and shrink characteristics in relation to heat, the diaphragm will contain more internal stress thereinside and exhibit further better performance.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A speaker diaphragm comprising:

first and second surface layers; and a middle layer sandwiched between the first and second surface layers, wherein the surface layers and the middle layer are made of a resin and fibers in the resin forming a fiber reinforced resin, the fibers having a length in a range of 3 to 50 mm, wherein the fibers in both the first and second surface layers are oriented in a direction radially oriented from a center to a periphery of the diaphragm and the fibers in the middle layer of the diaphragm are oriented in a multidimensional direction from the fibers in both of the first and second layers, and wherein a thickness of the middle layer is larger than a sum of thicknesses of both the first and second surface layers.

2. The speaker diaphragm according to claim 1, wherein said fibers are intertwined with each other in said resin.

3. The speaker diaphragm according to claim 1, wherein said resin contains fillers.

* * * * *